May 22, 1951  T. G. TUTTLE, SR.  2,554,074
SEEDER ATTACHMENT FOR TRACTORS
Filed July 7, 1947  2 Sheets-Sheet 1
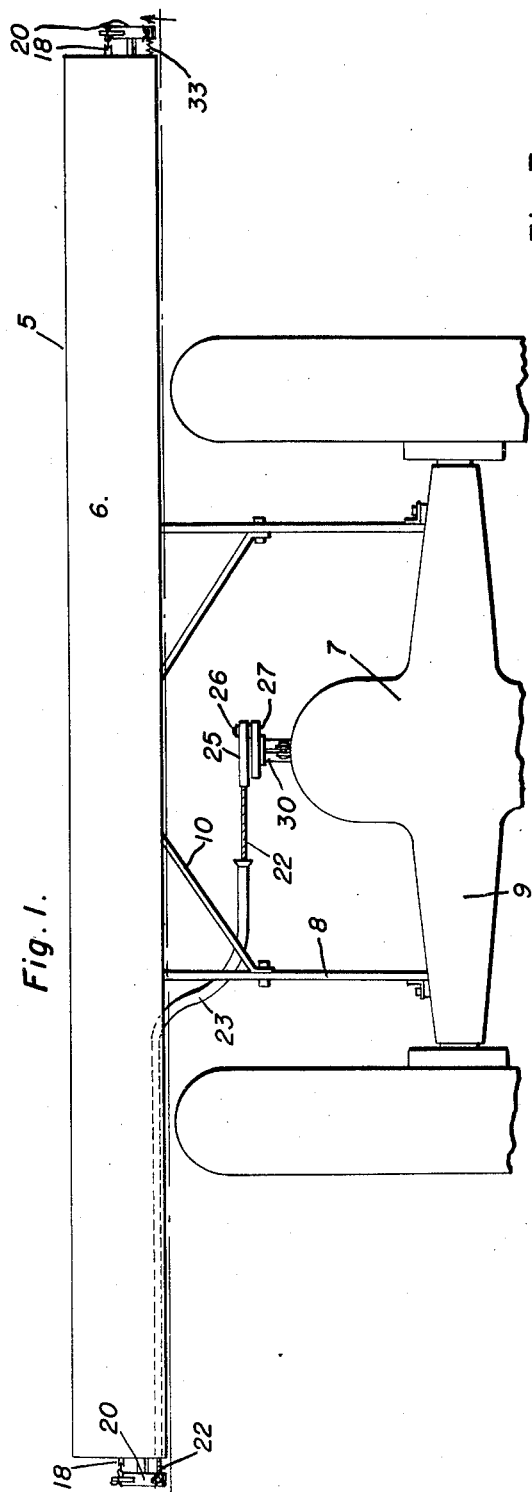
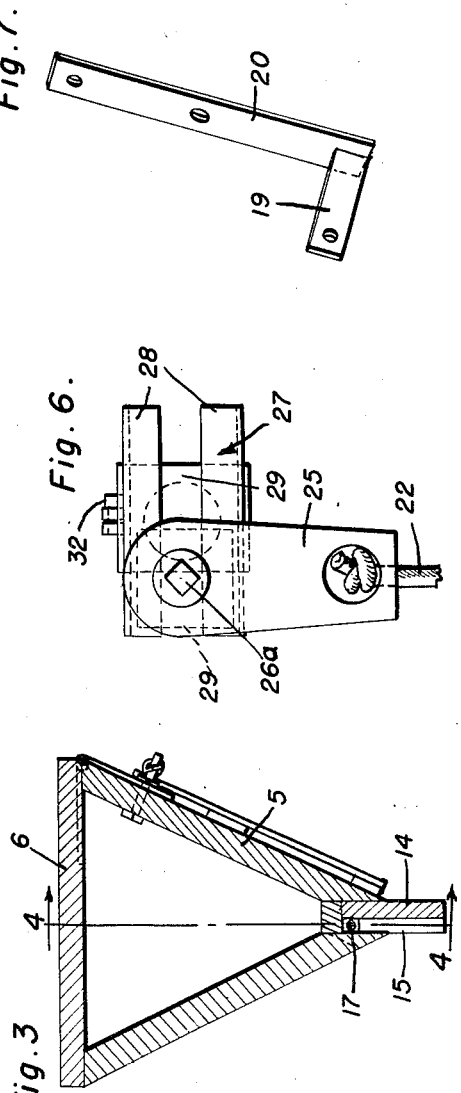
Inventor
Therman G. Tuttle, Sr.
By Clarence A. O'Brien
and Harvey B. Jacobson
Attorneys May 22, 1951 T. G. TUTTLE, SR 2,554,074
SEEDER ATTACHMENT FOR TRACTORS
Filed July 7, 1947 2 Sheets-Sheet 2

Inventor
Therman G. Tuttle, Sr.

By Clarence A. O'Brien
and Harvey B. Jackson
Attorneys

Patented May 22, 1951

2,554,074

UNITED STATES PATENT OFFICE 2,554,074

SEEDER ATTACHMENT FOR TRACTORS

Therman G. Tuttle, Sr., Portales, N. Mex.

Application July 7, 1947, Serial No. 759,374

3 Claims. (Cl. 275—9)

The present invention relates to new and useful improvements in seeders designed to broadcast small seed such as alfalfa, millet, grass seed and various other types of small seed as well as for use as a distributor for fertilizer in granulated form and the invention has for its primary object to provide a seeder which may be operatively attached to a conventional farm tractor.

An important object of the invention is to provide an agitator for the seeder embodying a length of flexible material extending longitudinally throughout the length of the seeder together with means for reciprocating the agitator from the power take-off of the tractor.

A further object of the invention is to provide a device of this character of simple and practical construction, which is efficient and reliable in operation, relatively inexpensive to manufacture, which may be easily and quickly attached in operative position on a tractor without necessitating any changes or alterations in the construction thereof and which is otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view;

Figure 3 is a transverse sectional view taken on a line 3—3 of Figure 2;

Figure 6 is a rear elevational view thereof;

Figure 7 is a perspective view of one of the pivoted arms for the agitator.

Figure 2:
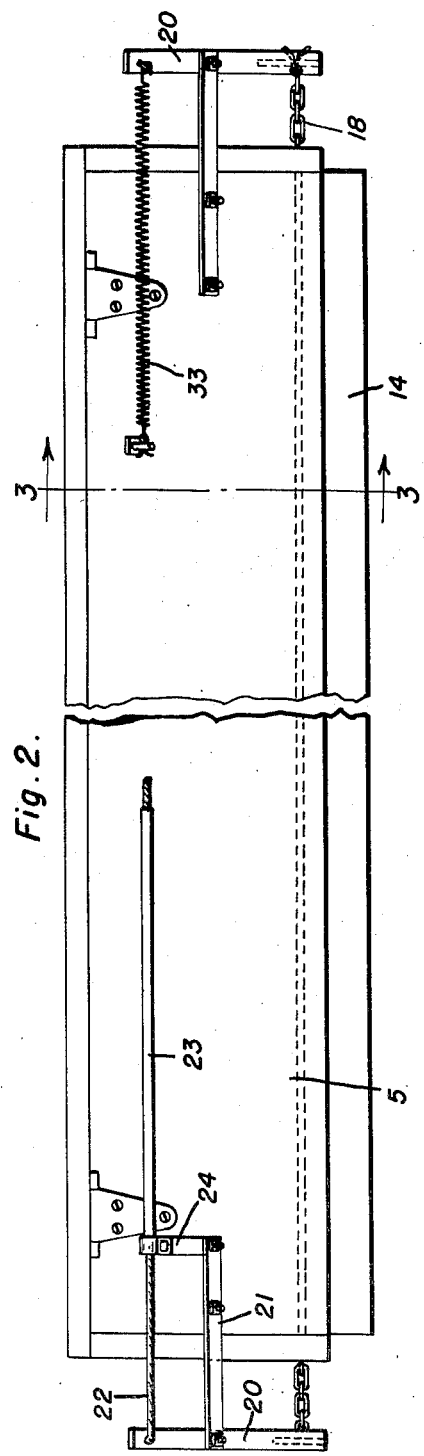
Figure 2 is an enlarged rear elevational view.
Figure 5:
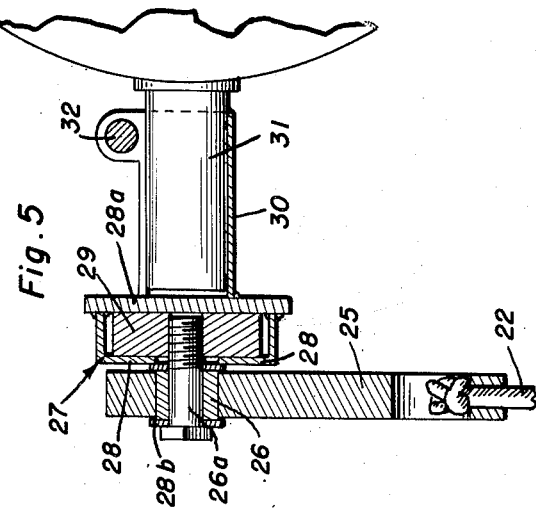
Figure 5 is an enlarged longitudinal sectional view of the drive connection for the agitator with the power take-off of the tractor.

Referring now to the drawings in detail wherein for the purpose of illustration I have disclosed a preferred embodiment of the invention, the numeral 5 designates an elongated trough-shaped seed hopper of substantially triangular shaped cross section and including a hinged lid 6 closing the top of the hopper and extending entirely throughout the length thereof. The hopper 5 is supported at the rear of a conventional farm tractor 7 by means of a pair of rearwardly extending arms 8 which are attached at the front ends to the rear axle housing 9 of the tractor and suitably attached at their rear ends to the hopper to support the latter in a transversely extending position at the rear end of the tractor. Braces 10 may also extend from the arms 8 to the hopper. Suitably secured in the bottom of the hopper 5 is a seed plate 11 extending throughout the length of the hopper and in which discharge openings 12 are formed at longitudinally spaced intervals, the surface of the seed plate in the region of the openings 12 having concaved countersinks or pockets 13 formed therein.

Figure 4:
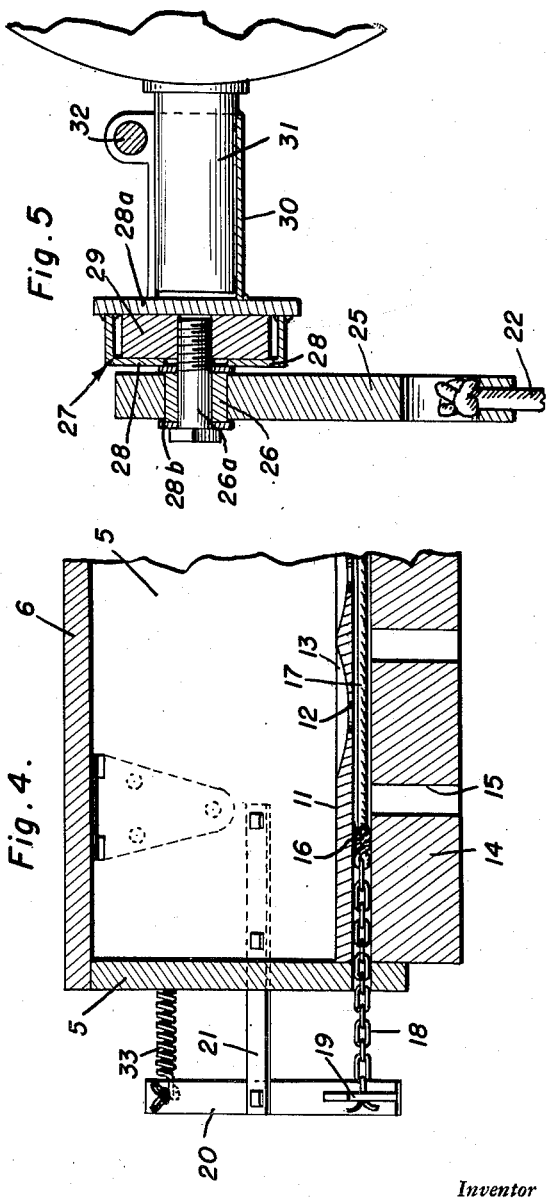
Figure 4 is a fragmentary longitudinal sectional view taken on a line 4—4 of Figure 3.

A distributor board 14 is likewise suitably secured in the lower edge of the hopper 5 immediately under the seed plate 11, the lower edge of the distributor board projecting downwardly below the bottom of the hopper. The rear surface of the distributor board 14 is formed with a plurality of vertical seed distributing grooves 15 which are offset with respect to the discharge openings 12 as shown in Figure 4 of the drawings.

The upper portion of the distributor board 14 is formed with a longitudinally extending channel 16 which provides a continuous passage which connects the openings 12 with the grooves 15. An agitator 17 in the form of a rope, cable or other flexible member is mounted for reciprocating movement in the channel 16, the agitator being of a diameter less than the diameter of the channel 16 whereby seed may pass from the openings 12 to the grooves 15 without complete obstruction by the agitator.

A chain or other flexible member 18 is attached to each end of the agitator 17 and extends outwardly at an adjacent end of the hopper 5. The outer ends of the chains 18 are attached to angularly extending brackets 19 at one end of rocker arms 20 pivotally attached intermediate their ends on supports 21 which project outwardly at each end of the hopper 5.

To the outer end of one of the rocker arms 20 is attached a flexible cable 22 which is slidably supported in a housing 23 secured to the front surface of the hopper 5 by brackets 24, the other end of the cable 22 being attached to the outer end of the pitman arm 25 which has its inner end provided with a bushing 26 in which a pin 26ª is journaled. The inner end of the pin is threaded into a block 29 adjustably carried by a channeled crank 27.

The crank 27 includes a pair of spaced parallel angle iron members 28 having one edge fixedly secured to a backing plate 28ª and their other edges spaced from each other to provide a slot 28ᵇ therebetween and in which the pin 26ª is adjustable longitudinally of the crank. The block 29 is clamped in adjusted positions by the free edges of the angle iron members 28 upon tightening of the pin 26ª. Projecting from the rear of the crank 27 is a split sleeve 30 clamped in position to a rearwardly projecting power take-off shaft 31 of the tractor by means of a bolt and nut 32, the crank 27 extending transversely of the shaft 31 to thus exert a pulling force on the cable 22 by a rotation of the crank to which the cable is attached by means of the pitman 25. The block 29 is adjustable longitudinally in the channel of the crank to vary the movement of the cable 22.

A coil spring 33 is attached at one end to the hopper 5 and has its other end attached to the other of said rocker arms 20 to cooperate with the cable 22 in moving the agitator 17 back and forth in opposite directions in a reciprocating movement.

Accordingly, in the operation of the device with the hopper 5 mounted in position at the rear end of a tractor 1 as shown in Figure 1 of the drawings, and with the crank 27 attached to the power take-off shaft 31 of the tractor, the crank 27 will thus be rotated to pull the rope or cable 22 in one direction and which, as a consequence, moves the agitator 17 in one direction in the channel 16. The spring 33 moves the agitator in an opposite direction. The reciprocating movement of the agitator 17 will work the seeds along the channel 16 from the openings 12 to the vertical discharge grooves 15 in the distributor plate 14 thereby serving to scatter the seed over the ground.

When the tractor is idle, the offset position of the openings 12 with respect to the discharge grooves 15 and the agitator 17 positioned in the channel 16 will obstruct the free flow of the seed from the openings 12 to the grooves 15 and thus prevent loss of the seed.

In view of the foregoing description taken in conjunction with the accompanying drawings it is believed that a clear understanding of the construction, operation and advantages of the device will be quite apparent to those skilled in this art. Accordingly, a more detailed description is deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A seeder comprising an elongated hopper adapted for mounting on a vehicle frame in transverse relation to the path of translation of the vehicle, said hopper having downwardly converging front and rear side walls to form a relatively narrow flat bottom having a plurality of uniformly longitudinally spaced apart concaved pockets in the inner surface of the bottom, each of said pockets having a discharge opening at its center; a distributor plate supported in an edgewise position under said bottom with its upper edge confined between the front and rear side walls of the hopper and having uniformly longitudinally spaced apart discharge openings in the rear face of the plate in offset relation with respect to the first-named openings, a horizontal channel in the rear face of the confined upper edge of the distributor plate and connecting said first and second openings, a flexible member freely slidable in said channel to feed seed from the first to the second openings, power operated means connected to one end of said member to move the same in one direction, and spring means moving the member in an opposite direction.

2. A seeder comprising an elongated hopper adapted for mounting on a vehicle frame in transverse relation to the path of translation of the vehicle, said hopper having downwardly converging front and rear side walls to form a relatively narrow flat bottom having a plurality of uniformly longitudinally spaced apart concaved pockets in the inner surface of the bottom, each of said pockets having a discharge opening at its center, a distributor plate supported in an edgewise position under said bottom with its upper edge confined between the front and rear side walls of the hopper and having uniformly longitudinally spaced apart discharge openings in the rear face of the plate in offset relation with respect to the first-named openings, a horizontal channel in the rear face of the confined upper edge of the distributor plate and connecting said first and second openings, a flexible member freely slidable in said channel to feed seed from the first to the second openings, power operated means connected to one end of said member to move the same in one direction, and spring means moving the member in an opposite direction, said power operated means including a variable crank, and a pitman arm connecting the crank to the flexible member.

3. A seeder comprising an elongated hopper adapted for mounting on a vehicle frame in transverse relation to the path of translation of the vehicle, said hopper having downwardly converging front and rear side walls to form a relatively narrow flat bottom having a plurality of uniformly longitudinally spaced apart concaved pockets in the inner surface of the bottom, each of said pockets having a discharge opening at its center, a distributor plate supported in an edgewise position under said bottom with its upper edge confined between the front and rear side walls of the hopper and having uniformly longitudinally spaced apart discharge openings in the rear face of the plate in offset relation with respect to the first-named openings, a horizontal channel in the rear face of the confined upper edge of the distributor plate and connecting said first and second openings, a flexible member freely slidable in said channel to feed seed from the first to the second openings, power operated means connected to one end of said member to move the same in one direction, said power operated means including a channel-shaped crank, a block secured in adjusted position in the crank, a pitman arm pivoted to the block and connected to the flexible member.

THERMAN G. TUTTLE, Sr.

REFERENCES CITED

The following references are of record in the file of this patent:

UNITED STATES PATENTS

| Number | Name | Date |
| --- | --- | --- |
| 389,548 | Corbin | Sept. 18, 1888 |
| 394,128 | Norton | Dec. 4, 1888 |
| 710,883 | Palmer | Oct. 7, 1902 |
| 800,847 | Herrick | Oct. 3, 1905 |
| 1,117,027 | Gelink | Nov. 10, 1914 |
| 2,219,505 | Pierson et al. | Oct. 29, 1940 |
| 2,416,804 | Ulrich | Mar. 4, 1947 |